(12) United States Patent
Hillforth et al.

(10) Patent No.: US 10,743,513 B2
(45) Date of Patent: Aug. 18, 2020

(54) MANURE-REMOVAL DEVICE (71) Applicant: LELY PATENT N.V., Maassluis (NL)

(72) Inventors: Mikael Hillforth, Alta (SE); Huibrecht Johannes Arjen Van Den Beukel, Delft (NL); Peter Henry Clements, Dordrecht (NL)

(73) Assignee: Lely Patent N.V., Maassluis (NL)

( * ) Notice: Subject to any disclaimer, the term of this patent is extended or adjusted under 35 U.S.C. 154(b) by 613 days.

(21) Appl. No.: 14/155,391

(22) Filed: Jan. 15, 2014

(65) Prior Publication Data

US 2014/0124000 A1 May 8, 2014

Related U.S. Application Data

(63) Continuation of application No. PCT/EP2012/062904, filed on Jul. 3, 2012.

(30) Foreign Application Priority Data

Jul. 15, 2011 (NL) .................................... 2007115

(51) Int. Cl.
*A01K 1/01* (2006.01)
*A01C 3/04* (2006.01)
(Continued)

(52) U.S. Cl.
CPC ................. *A01K 1/01* (2013.01); *A01C 3/04* (2013.01); *A01K 1/0128* (2013.01);
(Continued)

(58) Field of Classification Search
CPC ... E01H 1/0845; E01H 1/0827; E01H 1/0836; E01H 1/0863; E01H 1/006; A01K 1/0128; A01K 1/01; A01C 3/04; A47L 11/4044
See application file for complete search history.

(56) References Cited

U.S. PATENT DOCUMENTS 3,585,670 A * 6/1971 MacKinnon ........... A01C 23/04
15/328
4,193,159 A * 3/1980 Beard, III ............. E01H 1/0863
15/340.1
(Continued)

FOREIGN PATENT DOCUMENTS

CA 2505049 A1 10/2006
EP 1149953 A2 * 10/2001 ........... E01H 1/0827
(Continued)

OTHER PUBLICATIONS

International Search Report for PCT/EP2012/062904 dated Sep. 10, 2012.
(Continued)

*Primary Examiner* — Bryan R Muller
(74) *Attorney, Agent, or Firm* — Hoyng Rokh Monegier LLP; David P. Owen (57) ABSTRACT

A manure-removal vehicle and an assembly thereof having a manure-discharging location. The vehicle comprises a pump and a tank having an air discharge. The vehicle collects manure by means of a scraper and this is subsequently suctioned up via a manure extraction opening in the tank. The pump works at low power and in particular at low pressure, due to the fact that a constant stream of manure is collected in front of the opening, in particular if a sealing plate is provided.

20 Claims, 3 Drawing Sheets

(51) Int. Cl.
  *E01H 1/08* (2006.01)
  *A47L 11/40* (2006.01)
  *E01H 1/00* (2006.01)

(52) U.S. Cl.
  CPC .......... *A47L 11/4044* (2013.01); *E01H 1/006* (2013.01); *E01H 1/0827* (2013.01); *E01H 1/0845* (2013.01); *Y02A 40/294* (2018.01)

(56) References Cited

U.S. PATENT DOCUMENTS

| | | | | |
|---|---|---|---|---|
| 4,831,684 | A | * | 5/1989 | Duncan ................. A47L 11/283 15/340.1 |
| 5,208,841 | A | * | 5/1993 | Nakanishi ............ H04N 17/002 257/231 |
| 5,839,157 | A | * | 11/1998 | Strauser ................ E01H 1/0836 15/340.1 |
| 7,341,024 | B2 | * | 3/2008 | Wood ....................... A01K 1/01 119/416 |
| 7,426,769 | B2 | * | 9/2008 | Mensch ................... A01C 3/04 15/340.1 |
| 7,797,789 | B2 | | 9/2010 | Nuhn |
| 2009/0293911 | A1 | * | 12/2009 | Nuhn .................... A01K 1/0103 134/6 |
| 2011/0139179 | A1 | * | 6/2011 | Mendenhall ............ E01H 1/103 134/10 |
| 2014/0124000 | A1 | | 5/2014 | Hillforth et al. |

FOREIGN PATENT DOCUMENTS

| | | | | |
|---|---|---|---|---|
| EP | 2731420 B | | 9/2015 | |
| NL | 1036552 C | * | 8/2010 | ............... A01K 1/01 |
| WO | WO2013010785 A | | 1/2013 | |

OTHER PUBLICATIONS

Earlier Search Report for priority document NL2007115 including English Written Opinion dated Apr. 27, 2012.
Written Opinion for PCT/EP2012/062904 dated Jan. 15, 2014.
International Preliminary Report on Patentability for PCT/EP2012/062904 dated Jan. 30, 2014.

* cited by examiner

MANURE-REMOVAL DEVICE

CROSS REFERENCE TO RELATED APPLICATIONS

This application is a continuation of PCT application number PCT/EP2012/062904 filed on 3 Jul. 2012, which claims priority from Netherlands application number 2007115 filed on 15 Jul. 2011. Both applications are hereby incorporated by reference in their entireties.

BACKGROUND OF THE INVENTION

1. Field of the Invention

The invention relates to to a self-propelled manure-removal vehicle, having at least two wheels, at least one motor and a control device for displacing the vehicle in a desired direction of movement by driving at least one of the wheels, a tank for storing manure comprising a bottom having a lowest level, a side wall and an upper part, having an air discharge near the upper part and having a manure supply opening and a manure discharge opening, a vacuum pump which is connected to the control device and designed to apply a reduced pressure to the tank via the air discharge, and a manure-collecting device having a floor-scraping part which, viewed in the intended direction of travel, narrows to a closed end, wherein the manure supply opening, viewed in the intended direction of travel, is situated in front of the floor-scraping part and is at least partly surrounded by the floor-scraping part.

2. Description of the Related Art

Such vehicles are known in the prior art. Thus, U.S. Pat. No. 7,797,789 describes a vehicle comprising a V-shaped scraper with a manure-suctioning feature at the tip of the scraper. The manure is suctioned into a tank via an inlet on the front side. By reversing the pump action, the manure is pumped out on the rear side of the tank via a discharge opening. To this end, the pump is provided with a reversing valve.

A drawback of the known device is that it is unnecessarily complex and, in particular, contains an excessive number of moving parts, such as the valve. This is a drawback, in particular with the greatly soiling environment of manure-collecting vehicles.

BRIEF SUMMARY OF THE INVENTION

It is an object of the invention to reduce at least the abovementioned drawback. According to the invention, this object is achieved by providing a self-propelled manure-removal vehicle, having
  at least two wheels, at least one motor and a control device, for displacing the vehicle in a desired direction of movement by driving at least one of the wheels,
  a tank for storing manure comprising a bottom having a lowest level, a side wall and an upper part, having an air discharge near the upper part and having a manure supply opening and a manure discharge opening,
  a vacuum pump which is connected to the control device and designed to apply a reduced pressure to the tank via the air discharge, and
  a manure-collecting device having a floor-scraping part which, viewed in the intended direction of travel, narrows to a closed end, wherein the manure supply opening, viewed in the intended direction of travel, is situated in front of the floor-scraping part and is at least partly surrounded by the floor-scraping part, and
wherein the manure supply opening and the manure discharge opening are one and the same and are situated at least partly at the lowest level of the bottom of the tank.

In an embodiment, the vehicle comprises a sealing device which, viewed in the intended direction of travel, is situated in front of the manure discharge opening, is surrounded by the floor-scraping part and situated at a higher level than the bottom side of the floor-scraping part.

In an embodiment, the sealing device comprises a plate which connects two points on the floor-scraping part and, together with the floor-scraping part, horizontally encloses a manure buffer chamber.

In an embodiment, the total height of the vehicle in use is at most 65 cm.

In an embodiment, the pump is designed to generate a maximum underpressure of 0.1 bar in use.

In an embodiment, the pump is a membrane pump, and is connected, on the supply side, to the air discharge and, on the discharge side, to a pump discharge, wherein the pump discharge is designed to expel at the front side of the vehicle, viewed in the intended direction of travel.

In an embodiment, the floor-scraping part, at the end surrounding the manure supply opening, comprises a section which is horizontally narrowed with respect to the rest of the floor-scraping part.

In an embodiment, the opening of the air discharge is situated in the top of the tank.

In an embodiment, the vehicle rests on two wheels, on one side, and rests on a front support device, on the other side, and the tank is volume-symmetrically fillable with respect to the wheels.

In an embodiment, the vehicle further comprises a tank level sensor, designed to emit a full signal to the control device if a predetermined filling level of the tank has been reached.

In an embodiment, the vehicle comprises a battery and a connector for connecting it to an external battery-charging device for the purpose of charging the battery, wherein the control device is designed to switch off the pump during charging.

In an embodiment, the vehicle comprises a manure supply meter, designed to emit a manure supply signal to the control device, wherein the control device is designed to change a driving speed and/or pump capacity on the basis of the manure supply signal.

In an embodiment, the manure supply meter comprises a manure level meter which is designed to determine the level of an amount of manure which is situated in front of the sealing or in the manure buffer chamber.

In an embodiment, the manure supply opening and the manure discharge opening are situated at least partly at the lowest level of the bottom of the tank.

In an embodiment, the sealing device is flexible and/or height-adjustable.

In an embodiment, the total height of the vehicle in use is at most 60 cm.

In an embodiment, the pump is designed to generate a maximum underpressure of 0.06 bar.

In an embodiment, the pump discharge is designed to expel at the front side of the vehicle, viewed in the intended direction of travel above and in front of the floor-scraping part.

In an embodiment, the vehicle comprises substantially parallel side walls.

In an embodiment, the opening of the air discharge is situated in the centre at the top of the tank, In an embodiment, the opening of the air discharge is open towards the top.

In an embodiment, the vehicle further comprises a closable lid above the air discharge which is open towards the top.

In an embodiment, the front support device comprises a castor wheel or the floor scraping part.

In an embodiment, the manure level meter comprises an ultrasound level meter and/or an inductive or capacitive sensor or a conductivity meter.

In a further embodiment of the invention, an assembly is provided, comprising a vehicle and a floor with a manure-discharging location, comprising an opening in the floor and a manure storage chamber situated underneath said opening.

In a further embodiment of the invention, a method for operating a self-propelled, manure-removal vehicle is provided, comprising the following steps:

at least once carrying out the following steps:
collecting manure at the floor-scraping part by moving the vehicle;
suctioning up at least part of the collected manure in the tank by means of the pump;
emptying the tank; and
charging the battery, wherein charging of the battery is carried out when the tank is at least partly filled with manure.

Obviously, a simplification is already achieved by the fact that the manure supply opening and the manure discharge opening are one and the same. By additionally arranging these at least partly, and preferably completely, in the bottom, it is furthermore not necessary to provide the pump with a reversing device, since it now suffices to switch off the pump. On account of the force of gravity, the manure will then be able to flow out of the tank, in particular if, for example, a manure pit has been provided under the vehicle. In this case, it should be noted that it is preferable to arrange the opening completely in the bottom, so that at least as little as possible manure, if any, remains in the tank, which would be the case if the opening were situated in a side wall.

The invention also relates to an assembly of a vehicle according to the invention and a floor with a manure-discharging location, comprising an opening in the floor and a manure-store situated underneath said opening. In practice, it has been found that the manure in the tank will flow out of the opening if this opening is situated above the opening in the floor. In this case, it may suffice to switch off the pump, but in some cases this is not even necessary. All this will be explained in more detail in the particular embodiments of the vehicle and/or assembly which are to be described below.

In particular, the opening, that is to say the manure-supply and discharge opening may comprise a pipe. This pipe may serve to overcome any difference in height between the bottom of the tank and the suctioning location. In the context of the present application, the opening of the pipe and the opening in the tank, to which the pipe is connected, will be regarded as being one and the same.

In this case, it should be noted that the control device for displacement is also connected to the vacuum pump. Of course, it is also possible to provide independent control devices. For the sake of convenience, the control device in this application is understood to mean all components together which control a part of the vehicle, irrespective of whether they are connected to each other.

The manure-removal vehicle according to the invention operates in a very simple manner. While driving, the floor-scraping part, or manure slide, collects the manure and concentrates it in a spot near the manure supply opening, where the manure can be suctioned up by means of the pump. A detail is that a substantially constant amount of manure will collect in front of the floor-scraping part, obviously slightly dependent on the amount which is present. Of course, the pump will try to suction the manure, but as soon as the amount present or the suction power is too small, on balance nothing happens. At most, the manure will not be suctioned up further, but will not completely run out of the tank either due to its own consistency. The manure is, as it were, "suspended" as a result of the vacuum in the tank, which vacuum would only increase if manure were to run out of the tank. In addition, manure is prevented from running away by the manure which is still present in front of the floor-scraping part. Note that a high viscosity can effectively counteract this completely running away, because it causes friction, both with the opening as with the ground, which friction, together with the vacuum in the tank, prevents that the tank is emptied completely. With extremely viscous manure, that viscosity will cause sufficient internal friction to prevent the manure from running out of the tank under the influence of gravity even in the absence of vacuum. Then, the manure cannot overcome the friction through the opening in the tank. let alone the vacuum plus that friction. Herein, the viscosity, the size of the opening, respectively, needs to be such that no air can leak into the tank because then the vacuum cannot serve as a "stop". The result of all of this is that a kind of supply of manure is almost permanently present in front of said floor-scraping part. When the vehicle is moved, said manure supply will be pushed across the floor. This offers the significant advantage that said floor is moistened, which has a surprisingly advantageous effect on cleaning the floor and keeping it clean. By moistening the floor, film formation on the floor is greatly reduced or completely prevented and new manure is prevented from sticking. In the prior art, this problem is dealt with by separate spray nozzles, for example in NL1036552, but it will be clear that this requires not only a water supply and spray nozzles, but also a spray nozzle control, which is susceptible to failure. Surprisingly, with the vehicle according to the invention, this is a positive effect of the manure-removal principle which entails that not all manure is suctioned up as quickly and forcefully as possible. Incidentally, the manure supply opening will, in particular, be situated at the narrowed end of the floor-scraping part or at the tip of the chamber in front of the floor-scraping part. Another important remark concerns the fact that, partly due to the scraping action, the manure supply opening can remain relatively large, while the discharge force or the vacuum of the pump can remain surprisingly low, without (a large) air leak via said opening.

It should be noted here, that the invention applies to floors which are closed. With slatted floors and other floors comprising openings, hardly any manure will be collected by means of pushing it together. The floor-scraping part, also referred to as scraping part here, may be any known manure slide which according to the invention narrows in the direction opposite to the direction of travel. It may be made from any suitable material or combination of materials, such as steel and rubber.

In a particular embodiment, the vehicle according to the invention comprises a sealing means which, viewed in the intended direction of travel, is situated in front of the manure discharge opening, is surrounded by the floor-scraping part and situated at a higher level than the bottom side of the floor-scraping part. This sealing means serves to keep an amount of manure in front of the floor-scraping part which is as constant as possible and thus to optimize the operation. The sealing means offers a significant advantage due to the fact that it makes it possible for the manure supply opening to be large. Normally, this could lead to problems during suctioning up of the manure (requires a lot of power due to the significant air leak resulting from the large hole), but as the sealing function is now moved to the front in the chain, more particularly to said sealing means, it is possible to maintain a virtually constant amount of manure in front of the manure supply opening, which is sealed by the sealing means, while manure can be suctioned up virtually unhindered and continuously through the manure supply opening. In fact, the effective suction opening can thus be positioned very close to the ground surface, because that is in effect now the opening below the sealing means, while use can still be made of an effective floor-scraping means. For if the opening of the tank would itself be positioned very close to the floor directly, this would hinder the scraping of manure.

As a further explanation of the sealing means, a comparison can be made with a drinking fountain for e.g. pet birds. A small container such as a small bottle is filled with water and hung upside-down in a bowl. Now water will sink through the opening in the container, causing a vacuum above the water in the container. Initially, because of lack of resistance/counterpressure at the opening, the vacuum will rise so high that air will leak into the container (the water "gurgles"). The water level in the bowl will increase thereby. Because of the rising water level, the opening of the container will become closed off at some moment in time. Then, the water level in the container can drop so far, and the water level in the bowl can rise so far, that the vacuum in the container and the weight of the water in the container above the level in the bowl equals atmospheric air pressure. In the present invention, the vacuum is usually generated by the pump, but if it is off, or if manure should leak away, then the tank can serve as the container, and the space between the sealing means and the opening in the tank can serve as the bowl. Alternatively, one could say that the combination of the tank and the space between the sealing means and the opening in the tank serve as the container, and the manure in front of the sealing means (in the outside world) serves as the "bowl" in combination with the dimensions of the opening below the sealing means and the manure viscosity.

The sealing means preferably comprises an indentation or passage opening from the bottom edge in order to control the supply from said amount of manure in front of the floor-scraping part to the manure discharge opening. It should be noted that the actual sealing is partly due to the viscosity of the manure. In contrast to, for example, water, manure is generally sufficiently viscous so as not to leak through the sealing as a result of its own weight. Of course, the height of the sealing above the floor, or above the bottom side of the floor-scraping part has to be effective, that is to say sufficiently high to create a sufficiently large passage, but sufficiently low to prevent undesirable excessive leaking (running away) of manure. Simple tests using viscosity ranges which are customary in practice will lead to a practical height in a simple manner. It is a particular feature of the invention that no separate closing means is provided for the manure supply and discharge opening of the tank, which is thus without a closure, thus making the structure overall more simple and reliable. Tests have shown that the extremely soiled environment renders control of such a valve (or another closing means) highly unreliable, while an amount of manure in fact seals itself due to the selected construction using the sealing means in front of the floor-scraping part and thus achieves the same functionality.

Incidentally, the above remark regarding the possibility of using a large manure supply opening without a large amount of air leak applies to an increased extent when such a sealing is used. The chamber between the floor-scraping part and the sealing will in principle always be filled with manure, while a buffer forms in front of the sealing. This buffer can increase or decrease without the suctioning function through the manure supply opening being disturbed by leaking air. The supply of manure from the manure buffer chamber in front of the sealing can flow under the sealing to the chamber filled with manure and situated between the sealing and the floor-scraping part, and this is assisted by the pressure from the buffer which is produced by driving, and advantageously through the opening in the sealing part.

The sealing means is in particular flexible and/or height-adjustable. The flexibility ensures that even small hard objects which are slightly higher than the distance between the bottom and lower edge of the sealing means can still be suctioned up and discharged as a result of the bending of the sealing means. The height-adjustability of the sealing means, which may be provided, for example, by means of a spindle, hydraulic or pneumatic cylinder etc., offers the advantage that the amount of "backflush" or the quality of the sealing can be adapted to the viscosity of the manure, which in turn is a function of the digested feed, i.e. of the amount of grass, in particular of fresh grass, etc.

In embodiments, the sealing means comprises a plate which connects two points on the floor-scraping part and, together with the floor-scraping part, horizontally encloses a manure buffer chamber. This is a simple, but effective embodiment of the sealing which then runs from a first part of the floor-scraping part to a second part thereof and, in view of the narrowing shape, also from a first side wall to a second side wall. It should be noted that the manure buffer chamber which is mentioned here is not the same as the manure buffer in front of the sealing means. More accurately, the manure buffer chamber refers to the chamber for the manure between the sealing and the floor-scraping part which has not been suctioned up. It should moreover be noted that the plate does not necessarily have to be a straight plate, but may also be a curved, bent plate, etc.

Optionally, there is also provided a front slide, comprising an obstacle which is situated, viewed in the direction of travel, in front of the flexible sealing and adjoins either the sealing or the floor-scraping part, and has a passage height above the floor which is at most equal to a passage height of the completely bent sealing. In this case, the front slide is substantially non-flexible. The aim thereof is to effectively block lumps and the like which cannot even pass under a completely bent sealing before they end up under the vehicle and cause blockage or disruption of the process there. Here, "substantially non-flexible" means "so much less flexible than the sealing that, in practice, no bending occurs, but the lumps are pushed forward or aside. For example, the front scraper is made of metal, wood or hard plastic and the sealing is made of rubber.

Preferably, the total height of the vehicle in use is at most 65 cm, more preferably at most 60 cm. The vehicle is thus able to pass under standard railings, so that it can, for example, also reach beyond the sections of the animal shed which normally have to be cleaned. All this will be explained in more detail with reference to dumping the manure at a dumping site.

In embodiments, the pump is designed to generate a maximum underpressure of 0.1 bar in use, in particular a maximum of 1 mbar per mm of the height of the vehicle in use, more particularly 0.06 bar. Due to these very low requirements on the vacuum to be reached, the energy consumption is very low, as is the noise level. Since it is not necessary, in principle, for leakage air to leak along the manure and no pump with a high rotary speed is present, the noise level is very low and hardly any nuisance is caused to any animals that may be present. The vacuum level is such that manure which has a density similar to that of water is suctioned up to the top of the tank, to a tank level of at most 1 m, preferably 60 cm. Obviously, higher vacuum levels are possible, but rather disadvantageous, due to the higher energy consumption and noise level, and the fact that this leaves less, if any, manure in front of the floor-scraping part, so that the floor is no longer moistened.

In embodiments, the pump, in particular a membrane pump, is connected, on the supply side, to the air discharge and, on the discharge side, to a pump discharge, wherein the pump discharge is designed to expel at the front side of the vehicle, viewed in the intended direction of travel, and in particular above and in front of the floor-scraping part. In such embodiments, everything which is suctioned through the pump from the tank will, in principle, end up in front of the floor-scraping part again, and will thus be suctioned up again.

Advantageously, the floor-scraping part, at the end surrounding the manure supply opening, comprises a section which is horizontally narrowed with respect to the rest of the floor-scraping part. In particular, the side walls are substantially parallel side walls, that is to say the mutual angle between the side walls is less than 45°, preferably 0-15°. The narrowed section in this case starts, and is advantageously situated substantially in front of, the manure supply opening. As a result of this embodiment of the floor-scraping part, elongate parts in the manure, such as straw or grass, will be aligned to a certain degree, in which case the one end of the elongate parts will be directed towards the manure supply opening by said side walls. This ensures that these elongate parts are suctioned up more efficiently. Without this effect, the risk of the formation of bridges and blockage is greater. Advantageously, the manure supply opening, viewed in the direction of travel, adjoins the floor-scraping part on the rear side, in order thus to prevent an accumulation of manure in front of the scraping part.

In embodiments, the opening of the air discharge is situated in the top of the tank, advantageously completely at the top and preferably in the centre at the top of the tank. By arranging the air discharge in this way, i.e. not protruding from the tank but situated in the tank, a good compromise is achieved between compactness of the vehicle and available size of the tank, which volume may in principle even extend as far as the top side of the duct which extends from the opening of the air discharge. Placing the discharge in the centre of the tank also results in maximum insensitivity to sloshing of the contents of the tank. More preferably, the air discharge is open towards the top, so that only a thin air gap on the bottom side of the top side of the tank has to be provided. Still more preferably, a closable lid is provided above the air discharge which is open towards the top. Thus, maintenance, for example in the event of a blockage or other kind of soiling, is facilitated, since it then suffices to open the lid or cover and to introduce, for example, water, pressurized air or another cleaning fluid into the uncovered opening.

In an embodiment, the vehicle rests on two wheels, on one hand, and a front support means, in particular a castor wheel or the floor-scraping part, on the other, and the tank can be filled volume-symmetrically with respect to the wheels. The latter implies that the tank is shaped volume-symmetrically with respect to the wheels. This offers the advantage that the pressure on the support means is substantially independent from the filling level of the tank, and is therefore constant. This offers further advantages with regard to the degree of cleanliness to be reached and the driving and steering behaviour.

Advantageously, the vehicle according to the invention comprises a tank level sensor, designed to emit a full signal to the control device if a predetermined filling level of the tank has been reached. By means thereof, the vehicle can stop to suction manure when the tank is full in order to then, for example, drive to a dumping site. Preferably, the control device is designed to switch off the pump when it receives the full signal, more preferably it is also designed to switch the pump back on if the full signal is no longer being received. Thus, it is possible to prevent unnecessary consumption of energy, since the contents of the tank will remain in the tank anyway, due to the vacuum, even during driving. However, should a small amount of manure nevertheless leak away, and the level thus drop below "full" level, the pump can start to work again in order to suction some more manure on the way.

The vehicle according to the invention is self-propelled, which may, for example, refer to a manned, but preferably also autonomous, self-propelled vehicle. Preferably, such an autonomous self-propelled vehicle comprises a battery and a connector for connecting it to an external battery-charging means for the purpose of charging the battery, wherein the control device is designed to switch off the pump during charging. This also serves to prevent unnecessary consumption of energy.

In particular embodiments, the vehicle comprises a manure supply meter, designed to emit a manure supply signal to the control device, wherein the control device is designed to change a driving speed and/or pump capacity on the basis of the manure supply signal. Thus, the vehicle can take fluctuations in the supply of manure into account, that is to say variations in the density of manure on the floor. Adjusting the driving speed will change the supply, while changing the pump capacity will obviously adjust the processing capacity.

In particular, the manure supply meter comprises a manure level meter which is designed to determine the level of an amount of manure which is situated in front of the sealing or in the manure buffer chamber, and which comprises in particular an ultrasound level meter and/or an inductive or capacitive sensor or a conductivity meter. These are examples of sensors which can still measure the level of manure in highly soiled surroundings with some degree of reliability.

As has been stated above, the invention relates to an assembly of a vehicle according to the invention and a floor with a manure-discharging location, comprising an opening in the floor and a manure storage chamber situated underneath said opening. The vehicle according to the invention can drive to such a manure pit in a very simple manner in order to dump the manure from the tank therein. As has already been stated above, the pump can to this end be switched off, so that the manure flows from the tank only by the force of gravity. The resulting additional vacuum in the tank will be filled by air which leaks along the manure. In this case, the manure will start to "gradually drop" and thus prevent the formation of a bridge of manure across the opening in the manure pit and/or tank. This formation of bridges is a considerable problem, in particular with vehicles which regularly dump manure, as is the case with autonomous self-propelled vehicles, but also with wide manure slides, as they distribute the manure over a great width. Due to the relatively low viscosity, that is to say the thick-viscous character of manure, a relatively large amount of the manure will get caught on the edges, along the grates arranged on the opening, etc. After the manure has dried, the remaining opening will become increasingly smaller and access to the manure pit increasingly difficult. With the present invention, this problem is solved by the fact that the stream of manure flows out in a concentrated manner in one location. It has been found that such a stream is even capable of softening encrusted and dried manure to a certain extent and thus to clear to a sufficient degree a through-opening which was originally blocked. This is not, or at least not as readily, possible when using wide manure slides as they do not yield a concentrated stream of manure. In addition, it should be noted that the "gurgling" with the present invention produces additional mechanical forces which contribute to clearing the opening over the manure pit and keeping it free. If, in addition, the pump is also switched on during dumping, the further additional vacuum will create an even stronger gurgling effect.

The invention also relates to a method for operating a vehicle according to the invention, comprising the following steps:

at least once carrying out the following steps:
collecting manure at the floor-scraping part by moving the vehicle;
suctioning up at least part of the collected manure in the tank by means of the pump; and
emptying the tank;
charging the battery,
wherein charging of the battery is carried out when the tank is at least partly filled with manure. Charging the accumulator or battery when the tank is at least filled to a certain degree prevents the contents from drying up during the charging process which often takes a long time, e.g. an hour or longer. Obviously, this has advantages with regard to complete emptying of the tank. Nevertheless, charging the battery while the tank is empty is not excluded.

BRIEF DESCRIPTION OF THE DRAWINGS

The features and advantages of the invention will be appreciated upon reference to the following drawings, in which.

DESCRIPTION OF ILLUSTRATIVE EMBODIMENTS

The following is a description of certain embodiments of the invention, given by way of example only and with reference to the drawings.

Figure 1:
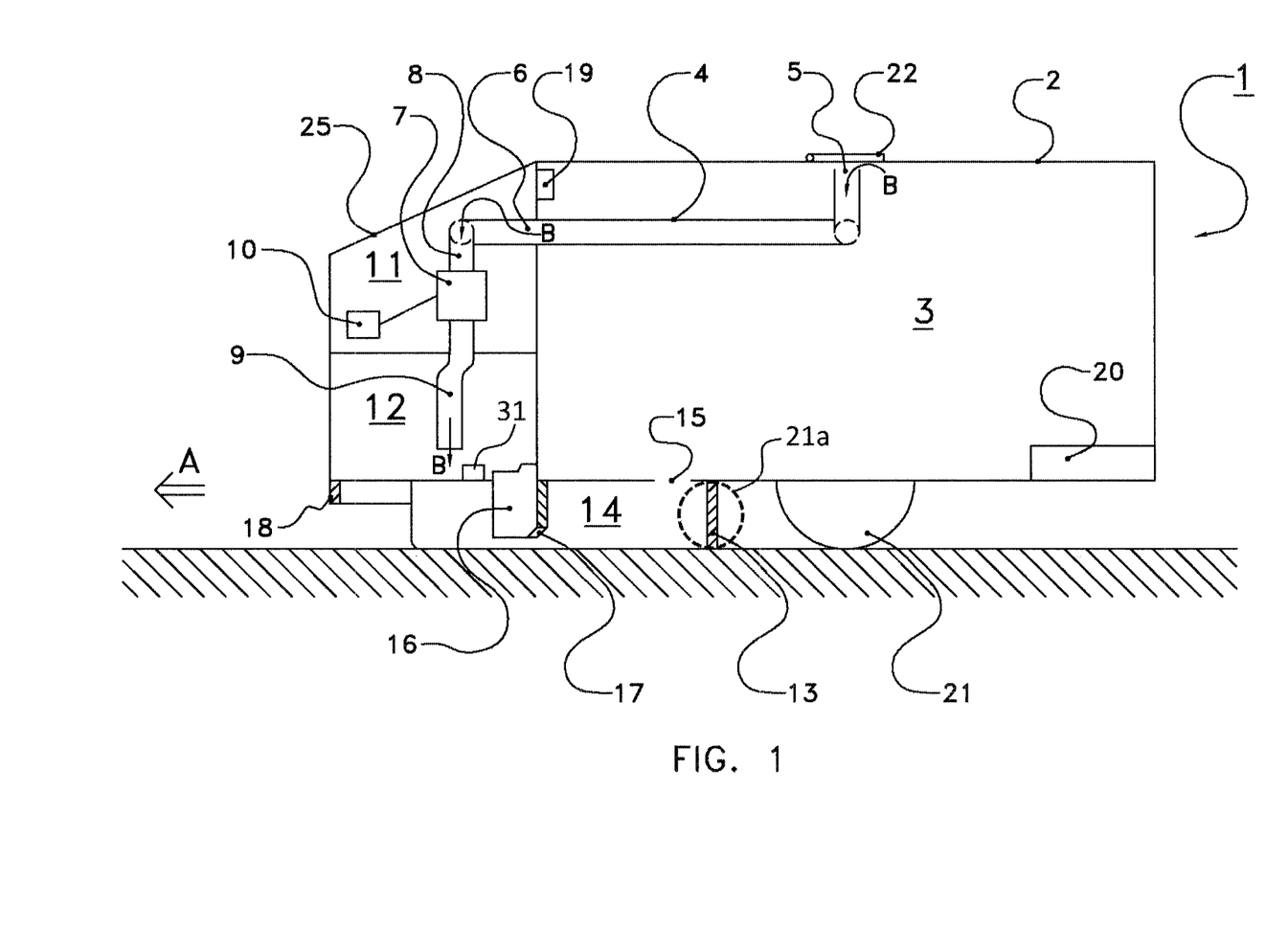
FIG. 1 shows in diagrammatic cross section a vehicle according to the invention.

FIG. 1 shows a diagrammatic cross section of a vehicle according to the invention in which the vehicle is denoted overall by reference numeral 1. It comprises a tank 2 with a manure storage chamber 3 containing an air discharge 4 with an air intake opening 5 and an air discharge opening 6. Reference numeral 7 denotes a pump with an intake pipe 8 and an outlet pipe 9. The pump 7 and the control device 10 are situated in a control chamber 11. Reference numeral 12 denotes an outlet chamber.

A floor scraper 13 delimits the rear side of a manure suctioning storage chamber 14 which is connected to a manure inlet opening 15 to the tank 2. At the front side, the chamber is delimited by a sealing plate 16 with an opening 17. An optional front slide 18 is situated right at the front.

In addition, a level sensor 19, a battery 20, a wheel 21 and a lid 22 are illustrated.

The vehicle 1 comprises a tank 2, the volume or storage chamber 3 of which is symmetrical with respect to the wheel 21. This means that when the chamber 3 is being filled, the load on the front side, that is to say the ground pressure on the floor scraper 13, does not change.

The air discharge 4 has an air intake opening 5 which is situated in the chamber 3, i.e. at the top in the centre. Thus, the chamber 3 can be filled to the maximum level. In order to prevent that too much manure is suctioned in and ends up in the pump, via the air extraction, indicated by the arrows B, a level sensor 19 is provided which can optionally switch off the pump when an excessive level is reached. Should manure, dirt etc. nevertheless end up in the air discharge 4 and in the pump 7, these can be cleaned in a simple manner by opening the lid 22 and flushing the assembly, e.g. with water and/or a cleaning agent. It should be noted that the lid is shown as being mounted on the surface, but it may also be mounted so as to be flush with the top side of the tank 2. The latter ensures the greatest available height for storage of manure at a certain total height of the vehicle. The latter is preferably 60 cm, so that it can pass under standard railings as used in dairy farming. Of course, any other height is also possible.

The air discharge 4 and the intake pipe 8 of the pump 7 are in principle connected to one another. The pump 7 and the control unit 10 for controlling the pump, and other matters, such as the motor and wheels, are situated in the control chamber 11 which is substantially "clean". The pump 7 is preferably, but not necessarily, a so-called dirty water pump, such as are used, for example, on ships and the like. These are particularly good at coping with (extremely) dirty water and the like and therefore also with manure, should this accidentally end up in the pump. In practice, the pump requires very low electric power. Thus, the reduced pressure to be generated in chamber 3 does not have to be higher than is associated with an equally high water column, i.e. 0.06 bar at a tank height of 60 cm. In addition, the air discharge speed does not have to be great, i.e. in principle only as high as the manure supply. Of course, this depends on the driving speed of the vehicle 1 and the thickness of the layer of manure to be swept up, but, in practice, a flow rate of several tens of litres per minute already proves to be sufficient to keep an animal shed for dairy cattle sufficiently clean. Due to this low power requirement, the system is eminently suitable for use with an autonomous vehicle with its own power supply.

Viewed in the direction of travel, which is indicated by an arrow A, the manure inlet opening 15 is situated at the end of the manure suctioning storage chamber 14 which is delimited by and adjoins the floor scraper 13 and the sealing part 16. The latter comprises an opening 17. The sealing 16 is situated slightly higher with respect to the bottom than the floor scraper 13, e.g. by one or at most a few centimetres. Thus, the manure to be swept and suctioned up can pass under the sealing 16 to the manure suctioning storage chamber 14, so that, in principle, a supply of manure is always present there. After all, it is important to constantly cover the manure inlet opening 15 with manure, so that the pump 7 does not suction in air, but rather manure. It is noted here that the viscosity of the manure is important for the discharge and buffer behaviour thereof. As a result of the viscous nature of the manure, particularly compared to, for example, water, manure which accumulates at a small through-passage, e.g. at the sealing part 16, will not flow out without restriction, but only up to a certain slanting cone. The more viscous the manure, the greater the slant and the narrower the cone. If desired, the height of the sealing can be modified. Should there be insufficient manure, an additional amount of manure can be suctioned up from the manure buffer forming in front of the sealing 16. Should there not be sufficient manure there either, an amount of air will nevertheless be suctioned in, but this will cause the manure present in the chamber 3 to slightly settle/flow out. This results in a higher vacuum in the chamber 3, while the manure which has flowed out is, in addition, situated in front of the manure inlet opening 15. These two factors ensure that at most a small amount of manure flows out, which is then still situated in the manure suctioning storage chamber 14. It will be suctioned up again once there is a sufficient new supply of manure. However, it is also important that a buffer can form in front of the sealing 16, from which manure can flow to the manure supply suction chamber, or manure buffer chamber, and that said sealing is preferably flexible. Manure and relatively small chunks can then be readily supplied to the manure buffer chamber, so that there is a more constant supply, as a result of which the manure supply opening 15 can be large without a great risk of leakage air or without a large amount of power being required to suction the manure through said large opening. It will be clear that a large opening 15 offers great advantages with regard to encrustation of and thus blocking by manure, and obviously also when the manure flows out again. Thus, a system is provided which works virtually like a non-return valve, but can still suction the manure without a valve. The absence of valves is a very significant advantage as manure has the disruptive tendency to cause severe encrustations.

In addition, it should be noted that the outlet pipe 9 expels air into the outlet chamber 12. Should there be any dirt or the like in the air or even manure, this will end up in front of the sealing plate 16 and thus be removed again.

At the front of the vehicle, there is a front slide 18 which can prevent foreign bodies, such as stones and the like, from ending up underneath the vehicle. To this end, the front slide 18 has a clearance above the floor which corresponds to that of the more curved sealing plate 16, or slightly lower, with respect to the floor. In addition, sealing plate 16 is in this case preferably flexible, so that relatively large bodies which have ended up in front thereof, for example, grass clumps and the like, can still be reliably transported away via the manure inlet opening 15 by bending the plate 16, while relatively large chunks which cannot pass underneath the more curved sealing plate 16 are efficiently blocked by the front slide 18.

Just like its counterpart (not shown), the wheel 21 shown in the drawing is electrically powered by a battery 20 and controlled by control unit 10. In principle, the floor scraper 13 can serve as a third supporting point, or optionally also a castor wheel (optional castor wheel 21a is shown in phantom), or the like. The latter offers advantages with regard to control of the vehicle.

Figure 2:
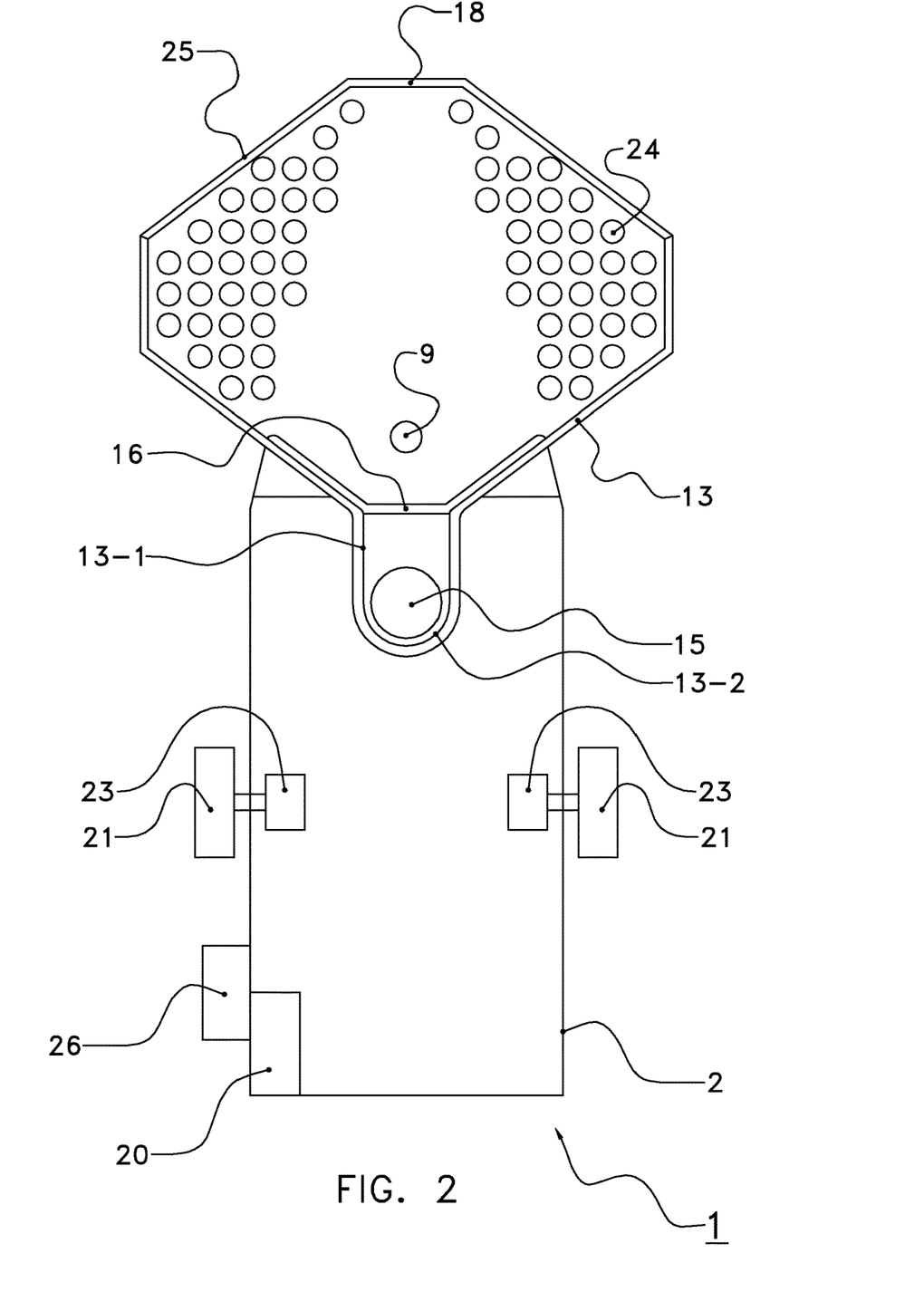
FIG. 2 diagrammatically shows a bottom view of the vehicle from FIG. 1.

FIG. 2 diagrammatically shows a bottom view of the vehicle from FIG. 1. Similar parts are denoted by the same reference numerals.

Furthermore, FIG. 2 shows two wheels 21, each with a motor 23, and holes 24 in the cover 25. The floor scraper 13 is furthermore shown with a suddenly elongate part 13-1 and a rear part 13-2.

It can clearly be seen in the figure that the floor scraper 13 can collect manure over a relatively wide path. The latter is concentrated as a result of the narrowing shape. Furthermore, the suddenly parallel part 13-1 ensures that any elongate elements in the manure supply, such as stalks of straw or the like, are slightly stretched, so that they can also be suctioned up into the manure inlet opening 15 and do not cause the formation of bridges. In addition, any manure which may flow out, when there is not sufficient supply or the like, will be limited to this narrow part, behind the sealing 16.

The cover 25 which, inter alia, serves to prevent animals from accessing the extraction part and the like, is provided with holes 24 in the part which protrudes beyond the control chamber (not shown separately here). These are intended to allow any animal manure which may land thereon to pass through.

Furthermore, reference numeral 26 diagrammatically shows a charging strip unit for connecting to a charging station for charging the battery 20.

Figure 3:
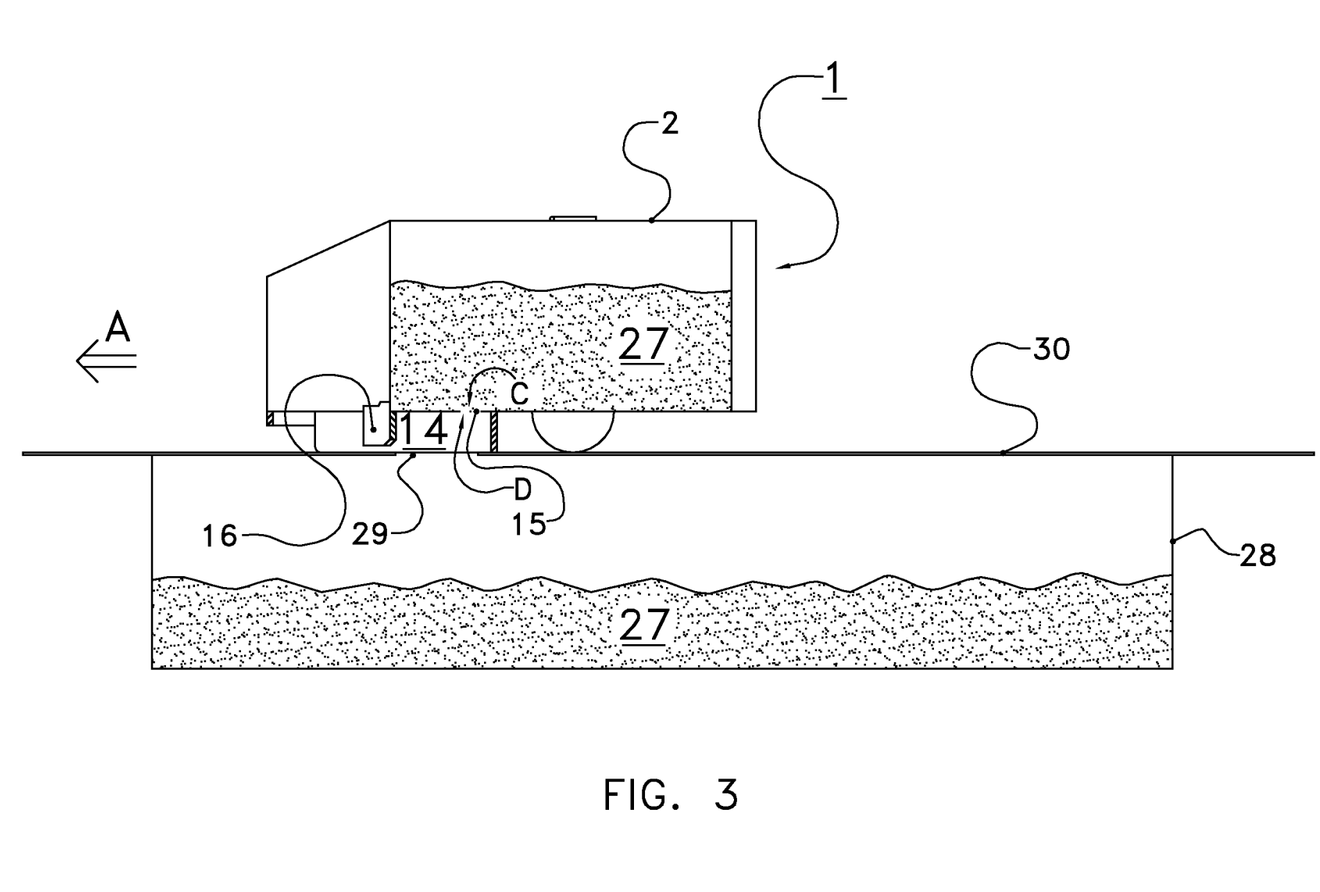
FIG. 3 shows an assembly of a vehicle according to the invention and a manure pit.

FIG. 3 diagrammatically shows an assembly of a vehicle 1 according to the invention and a manure pit 28.

At least the manure suctioning storage chamber 14 of the vehicle 1 has been driven as far as the dumping opening 29 in the floor 30 of, for example, an animal shed. The manure 27 in the tank 2 of the vehicle 1 will then run via the manure inlet opening 15 into the manure pit 28 in the direction of arrow C. At the same time, air will run into the tank 2 via the opening 15. Certainly if the pump remains switched on and there is therefore a higher vacuum, on average, and therefore also a greater pressure difference with the surroundings, the movement of manure and air will be relatively strong, as a result of which the tank can be emptied more reliably and, in particular, the dumping opening 29 can stay open more reliably or, if the latter has been blocked as a result of the formation of bridges of encrusted dried manure, a more efficient reopening can be effected.

It should furthermore be noted here, that the manure 27 will remain in the tank even if the pump is switched off or fails over a closed floor, due to the sealing plate 16 and the viscosity of the manure. Without a sealing, a slight amount of manure could flow out, depending on the viscosity and the size of the opening 17.

Further modifications in addition to those described above may be made to the structures and techniques described herein without departing from the spirit and scope of the invention. Accordingly, although specific embodiments have been described, these are examples only and are not limiting upon the scope of the invention.

What is claimed is:

1. A self-propelled manure-removal vehicle for removing manure from a floor, comprising:
   at least two wheels, at least one motor and a control device, for displacing the vehicle in a desired direction of travel by driving at least one of the wheels,
   a tank for storing manure comprising an interior defined by a bottom wall having a lowest level, a side wall and an upper part, having an air discharge near the upper part,
   a vacuum pump which is connected to the control device and configured to apply a negative pressure to the tank via the air discharge, and
   a manure-collecting device having a floor-scraping part which, viewed in the direction opposite to the desired direction of travel, narrows to a closed end, defining a collecting area, wherein the tank comprises a manure supply/discharge opening which is arranged through the bottom wall of the tank and is at least partly surrounded by the floor-scraping part fluidly connecting the collecting area with the interior of the tank, wherein the manure supply/discharge opening is without a closure capable of separating the collecting area from the interior of the tank, and the manure supply/discharge opening is configured to supply manure from the floor into the tank and to discharge said manure from the tank, wherein the control device is configured to control the vacuum pump so as to apply negative pressure to the tank when the vehicle is displaced over the floor for supplying manure from the floor via the manure supply/discharge opening into the tank, and wherein the control device is configured to (i) switch off the vacuum pump or (ii) control the vacuum pump so as to keep applying negative pressure to the tank when the vehicle is situated with the supply/discharge opening in the bottom wall of the tank above an opening in the floor at a manure-discharging location to cause manure from the tank to be discharged through said opening in the floor on account of the force of gravity.

2. The vehicle according to claim 1, comprising a sealing device which, viewed in the desired direction of travel, is situated in front of the manure supply/discharge opening, is surrounded by the floor-scraping part and is situated at a higher level than a bottom side of the floor-scraping part.

3. The vehicle according to claim 2, wherein the sealing device comprises a plate which connects two points on the floor-scraping part and, together with the floor-scraping part, horizontally encloses a manure buffer chamber.

4. The vehicle according to claim 1, wherein the total height of the vehicle during operation is at most 65 cm.

5. The vehicle according to claim 1, wherein the vacuum pump configured to generate a maximum vacuum pressure of 0.1 bar during operation.

6. The vehicle according to claim 1, wherein the vacuum pump is a membrane pump and is connected, on a supply side, to the air discharge and, on a discharge side, to a pump discharge, wherein the vacuum pump discharge is configured to expel at the front side of the vehicle, viewed in the desired direction of travel.

7. The vehicle according to claim 1, wherein the floor-scraping part, at the end surrounding the manure supply opening, comprises a section which is horizontally narrowed with respect to the rest of the floor-scraping part.

8. The vehicle according to claim 1, wherein an opening of the air discharge is situated in a top part of the tank.

9. The vehicle according to claim 1, wherein the vehicle rests on two wheels, on one side, and rests on a front support device, on the other side, and the tank is shaped volume-symmetrically with respect to the wheels.

10. The vehicle according to claim 1, comprising a tank level sensor, configured to emit a full signal to the control device if a predetermined filling level of the tank has been reached.

11. The vehicle according to claim 1, comprising a battery and a connector for connecting the battery to an external battery-charging device for the purpose of charging the battery, wherein the control device is configured to switch off the vacuum pump during charging.

12. The vehicle according to claim 1, wherein the manure supply/discharge opening is situated completely at the lowest level of the bottom of the tank.

13. The vehicle according to claim 6, wherein the vacuum pump discharge is configured to expel at the front side of the vehicle, viewed in the desired direction of travel above and in front of the floor-scraping part.

14. The vehicle according to claim 7, comprising side walls, which are parallel to one another.

15. The vehicle according to claim 8, wherein the opening of the air discharge is situated in the centre at the top of the tank.

16. The vehicle according to claim 8, wherein the opening of the air discharge is open towards the top of the tank.

17. The vehicle according to claim 8, further comprising a closable lid above the air discharge which is open towards the top of the tank.

18. The vehicle according to claim 9, wherein the front support device comprises a castor wheel or the floor scraping part.

19. A system comprising the self-propelled manure-removal vehicle according to claim 1 and a floor with a manure-discharging location, comprising an opening in the floor and a manure storage chamber situated underneath said opening.

20. A method for operating a self-propelled manure-removal vehicle, comprising the following steps:

providing a self-propelled manure-removal vehicle according to claim 1 at least once carrying out the following steps:

collecting manure at a floor-scraping part by moving the vehicle;

suctioning up at least part of the collected manure in a tank of the vehicle by means of a vacuum pump;

emptying the tank of the vehicle; and charging a battery of the vehicle, wherein charging of the battery is carried out when the tank of the vehicle is at least partly filled with manure.

* * * * *